Dec. 21, 1965  C. R. BRATTON  3,224,191
ROCKET MOTOR CONSTRUCTION
Filed May 20, 1963  2 Sheets-Sheet 1
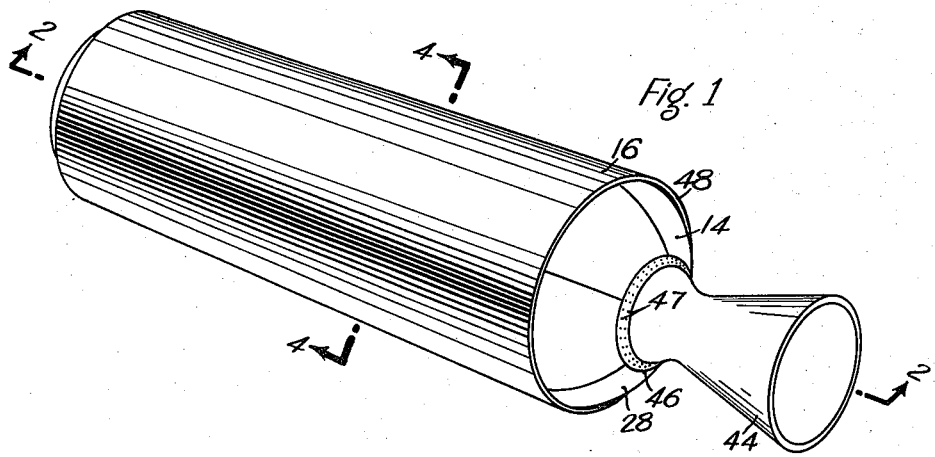
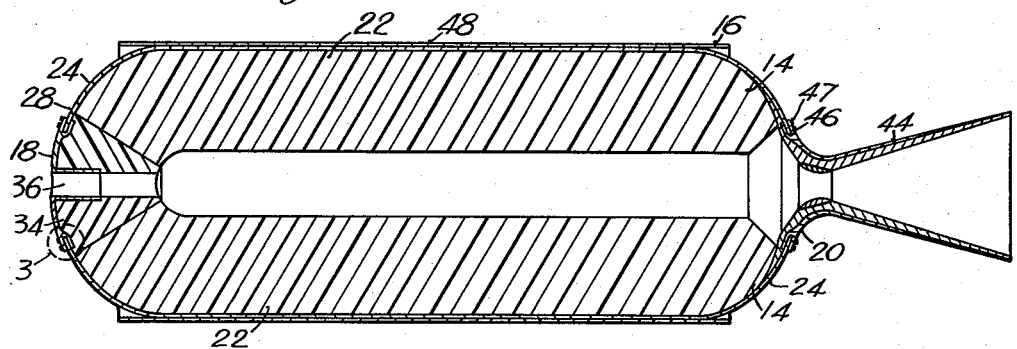
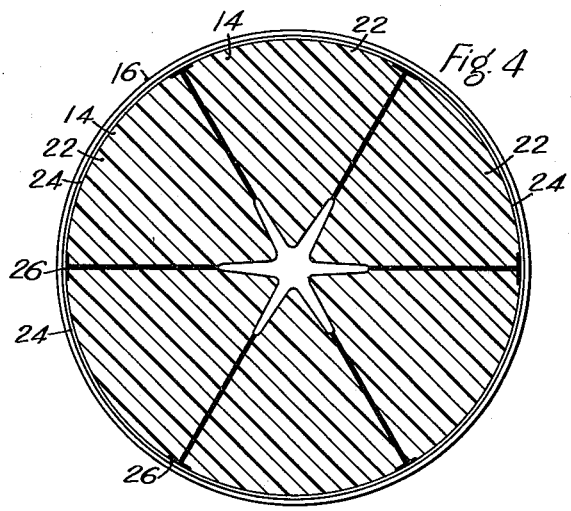
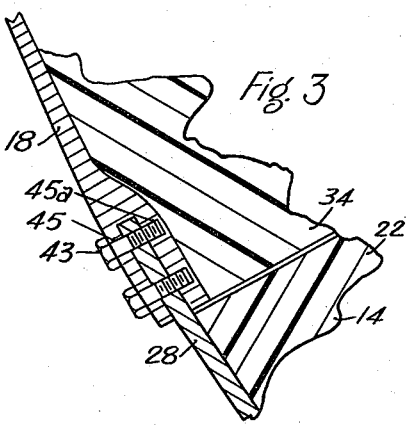
INVENTOR.
Clarence R. Bratton
BY
Curtis, Morris & Safford
ATTORNEYS Dec. 21, 1965 C. R. BRATTON 3,224,191
ROCKET MOTOR CONSTRUCTION
Filed May 20, 1963 2 Sheets-Sheet 2
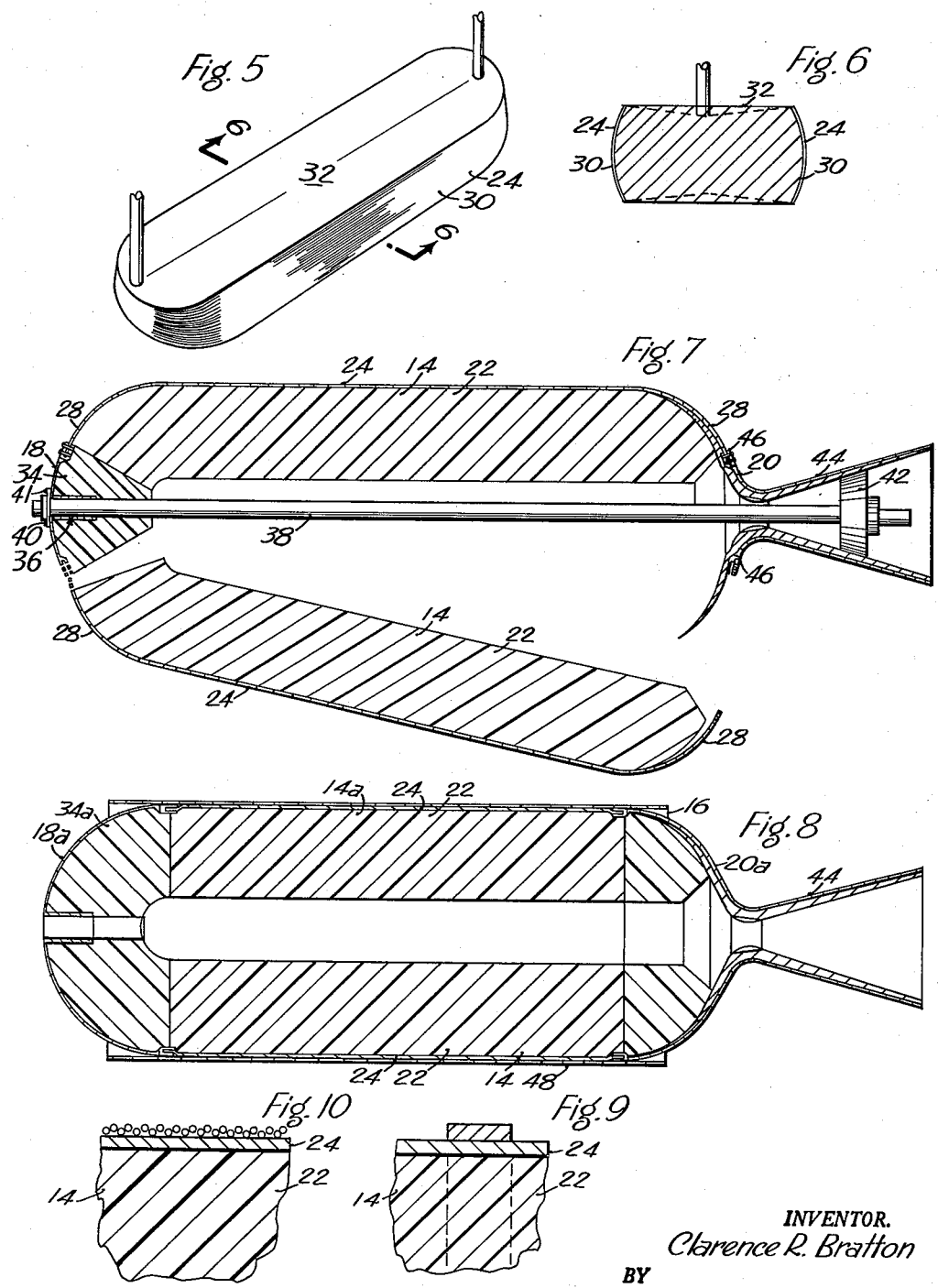
INVENTOR.
Clarence R. Bratton
BY
Curtis, Morris & Safford
ATTORNEYS

United States Patent Office 3,224,191
Patented Dec. 21, 1965

3,224,191
ROCKET MOTOR CONSTRUCTION
Clarence R. Bratton, Brigham City, Utah, assignor to Thiokol Chemical Corporation, Bristol, Pa., a corporation of Delaware
Filed May 20, 1963, Ser. No. 281,620
7 Claims. (Cl. 60—35.6)

This invention relates to a rocket construction of the type using a solid-propellant. More particularly, the invention relates to a construction in rocket motors that permits assembly of the casing and solid propellant at the launching site, and hence, may be applicable to the construction of very large rocket motors.

Very-large, solid-propellant rocket motors present problems in handling and transportation in that the size and weight of such motors may exceed the limits for conventional transportation means and of available handling equipment. To circumvent such handling and transportation problems, the rocket may be manufactured at the launch-cite. However, problems peculiar to this technique also exist, and construction of rocket motor casings at the launch site would be extremely difficult and expensive if done in the conventional manner. Large-scale, propellant-mixing and casting equipment would be required, and large mandrels used to form the internal cavities of the solid-propellant charges would be necessary—with the attendant problem of mandrel manufacture, handling, installation and extraction. Quality control for large rockets also presents a problem, since visual inspection of the ignition surface and radiographic inspection of the interior of the solid-propellant charge cannot readily be accomplished, and a defect of any magnitude in the solid-propellant charge would render the rocket motor useless. Thus, the risk of failure by casting a very large, solid-propellant rocket motor at the launch site is substantial.

My invention avoids these difficulties by providing a rocket motor than can be manufactured in separate components to be assembled at the missile-launching site. Hence, shipping, storage, and handling problems are avoided because each component may be handled separately until final assembly.

It is therefore an object of my invention to provide a solid-propellant rocket motor construction which permits the manufacture of very large motors without exceeding the limits imposed by existing transportation and handling facilities.

Another object of my invention is to provide a rocket motor construction which eliminates the use of a large mandrel for forming the combustion chamber.

Another object is to eliminate the need for large-scale propellant mixing and casting equipment.

Another object is to facilitate solid-propellant charge inspection and quality control, and thus to reduce the risk of the defects in the propellant charge of a rocket motor.

Other objects and advantages of my invention will become apparent as the following description is read with reference to the accompanying drawings, in which corresponding parts are designated by identical characters throughout the views.

FIGURE 1 is a perspective view of a solid-propellant rocket motor constructed in accordance with our invention.

FIGURE 2 is a sectional view taken on line 2—2 of FIGURE 1.

FIGURE 3 is an enlarged view of the area "3" of FIGURE 2, marked by a broken circle, showing a typical means for joining the longitudinal components of the rocket motor to an end closure thereof.

FIGURE 4 is a cross section taken on line 4—4 of FIGURE 1 showing the relative arrangement of the longitudinal components.

FIGURE 5 is perspective view of a mandrel for making the longitudinal support members.

FIGURE 6 is a sectional view taken on line 6—6 of FIGURE 5.

FIGURE 7 is a sectional, exploded view to illustrate the manner in which the components of my invention are assembled.

FIGURE 8 is a sectional view similar to FIGURE 2 showing an alternate embodiment of the invention.

FIGURE 9 is a sectional view of a part of a rocket motor casing in which the longitudinal components are bound together by wound filaments, and;

FIGURE 10 is a view similar to FIGURE 9 showing the components bound together by peripheral bands.

As illustrated in FIGURES 1, 2 and 4, the rocket motor incorporating the novel features of my invention essentially comprises a plurality of longitudinal components 14 held together in a cylindrical arrangement by a hollow cylinder 16, a forward closure 18, and an aft closure 20 that includes a nozzle.

Each longitudinal component, as shown in FIGURES 2 and 4, comprises a long, wedge-shaped portion 22 of the propellant charge bonded to a support member 24 in a manner that, in cross section, resembles a sector of a circle, with the support member 24 disposed on the circumference thereof. The support members 24, in my preferred embodiment of the invention, are made of glass fibers impregnated with phenolic resin. Strips 26 of insulation material such as synthetic rubber are interposed between the portion 22 of the propellant charge and the support member 24 along one edge of each longitudinal component 14 such that approximately half of the insulation strip is confined between the propellant and the support member, the other half projecting from the side of the component 14. The opposite edge of each component 14 has a longitudinal recess between the propellant and the support member to receive the protruding portion of the insulation from the adjacent component 14. The end portions 28 of each longitudinal component 14 illustrated in FIGURE 2 are curved inwardly so that when the longitudinal components 14 are assembled to form the finished rocket motor, the end domes thereof will conform to a surface of revolution upon which the hoop stress will be equal to zero. Such a curve is well known in the art and a detailed discussion may be found in Stresses in Shells by Wilhelm Flugge, Chapter Two, Part One, copyrighted by Springer-Verlag OHG., of Berlin, Gottingen, and Heidelberg, Germany.

The method of manufacturing the support members of components 14 is best shown in FIGURES 5 and 6. Strands 30 of glass fibers impregnated with a resin such as phenolic or epoxy are wound under tension on two sides of a mandrel 32 that is carefully shaped to the same contour as the support members 24 to be formed. The mandrel 32 is then placed in an oven where the completed wrapping is subjected to a heat treatment for curing of the resin. After curing, the hardened wrappings are separated at the ends and removed from the mandrel. In this manner two support members 24 may be manufactured simultaneously. During the wrapping process, the end portions of the support members may be reinforced in a well-known manner such as by inserting sheets of steel in laminar fashion between the layers of the wound strands. After completion, the end portions of the support members 24 are drilled to provide holes that correspond with those in the rims of the end closures 18 and 20. The wedge-shaped portions 22 of propellant, which have been formed and cured in appropriate molds, are then bonded to the support members 24, as are the strips of insulation 26.

The forward end closure 18, which has been fabricated of steel, is completed in a similar fashion by bonding a cone-shaped portion 34 of the propellant charge to the inner surface thereof. If it is desired that the igniter for the rocket engine be mounted in the forward closure, a hole 36 penetrates both the steel and propellant portions of the forward closure 18 to accommodate the igniter.

The method of assembling the above components to form a finished rocket motor is best shown in FIGURE 7. To facilitate this assembly, an apparatus is used which comprises a central rod 38, a disk 40, and a plug 42. The disk 40 and the plug 42 are centrally-perforated for sliding motion on the rod 38, and are capable of being locked in position by means of set screws in integral collars. The disk 40 is first attached to the forward closure 18 by means of screws 41 which penetrate holes in the disk 40 and are received in threaded engagement with tapped holes existing in the forward closure 18 for the purpose of attaching the igniter to the completed rocket motor. The disk 40 is then locked in place on the rod 38, and the plug 42 is inserted into the exit cone 44 of the aft closure 20 and also locked in place on the rod 38 so that the forward and aft closures 18 and 20 are in the proper relationship for assembly of the longitudinal components 14 thereto. Interfaces between the various portions of the propellant charge are then coated either with uncured propellant or with combustion-inhibiting compositions which are well known in the art, so that no additional and undesired burning surfaces will exist in the assembled rocket motor; and the strips of insulation 26 along the outside edges of the longitudinal components 14 are coated with a bonding agent. The forward edges of the support members 24 are then inserted into the bifurcated outer rim of the forward closure 18 and secured thereto by means of screws 43, see FIGURE 3, which pass through registering holes 45 in the outer rim of the forward closure and the support member 24 and are secured into threaded engagement with tapped holes 45a in the inner rim of the forward closure 18. The insulation strips 26 are then carefully layed into the recesses in adjacent longitudinal components 14, and the aft ends of the support members 24 are placed so that holes therein are in registry with tapped holes in the aft closure 20. A retaining ring 46 equipped with holes capable of being registered with those of the support members 24 and the aft closure 20 is then placed over the end portions of the support members 24 and is used to confine the support members tightly to the aft closure 20 by means of screws 47. The cylindrical portion of the assembled motor is then covered with a flexible, thermal insulation such as synthetic rubber and the external surface of this insulation is coated with a bonding agent. A hollow cylinder 48 is then placed upon this cylindrical portion of the rocket engine for hoop support thereof. The cylinder 48 may be replaced either by a series of hoops, see FIGURE 9, or by circumferential windings of glass fiber strands similar to that used in the manufacture of the longitudinal support members 24, see FIGURE 10. The assembling apparatus comprising the rod 38, disk 40, and plug 42 is then removed from the completed rocket motor.

An alternate embodiment of my invention is illustrated in FIGURE 8. This embodiment differs from that previously described only in that the end closures 18a and 20a are large enough to incorporate the complete curvatures of the end domes of the rocket-motor pressure vessel, so that the nest of longitudinal components 14a of the casing is cylindrical and is straight in longitudinal cross section except for its extreme ends which extend into the bifurcated ends of the closures. In this embodiment, the end domes of the rocket motor may conform to surfaces of revolution other than that which is designed for zero hoop stress. Also, in this embodiment of the invention, the aft closure 20a is equipped with a portion of the propellant charge 21 similar to that 34a of the forward closure, i.e. a centrally-perforated hemisphere.

A rocket motor has been described in some detail which may be constructed from prefabricated components at the launch site of the missile, thus eliminating many handling, transporting, and inspecting problems associated with very-large, solid-propellant rocket motors. Although specific embodiments of this invention have been described in considerable detail, it should be noted that these constructions may be varied without departing from the spirit and scope of the invention.

I claim:

1. A solid-propellant rocket motor having a noninflammable casing forming a pressure vessel and containing a solid propellant comprising a plurality of components, each component being in the form of a longitudinally extending sector of a generally cylindrical shaped body and comprising a long, arcuate supporting member and a wedge shaped solid propellant bonded on one side thereof, said components being assembled in a cylinder-like arrangement and sealed to each other with said supporting members oriented outwardly; means surrounding said components for retaining them in assembled relation; a separate aft closure attached to one end of said assembled components and forming a nozzle; and a separate forward closure attached to the opposite end of said assembly to retain the ends of said components in a fixed relationship and complete the rocket motor casing.

2. A rocket motor in accordance with claim 1 wherein said forward closure has a portion of the propellant charge bonded to the inner surface thereof for inclusion with the propellant of said longitudinal components to form the complete charge.

3. A rocket motor in accordance with claim 1 wherein said aft closure has an annular portion of the propellant charge bonded to the inner surface thereof for inclusion with the propellant of said longitudinal components to form the complete charge.

4. A rocket motor in accordance with claim 1 wherein the means surrounding said components is a hollow cylinder.

5. A rocket motor in accordance with claim 1 wherein said means surrounding said components is a circumferential winding of filaments impregnated with resin and bonded to said components.

6. A rocket motor in accordance with claim 1 wherein said means surrounding said components is a series of hoops.

7. A rocket motor in accordance with claim 1 wherein the ends of said supporting members are curved inwardly, and said closure for each end is attached to the edge of the curved portion.

References Cited by the Examiner

UNITED STATES PATENTS

| | | | |
|---|---|---|---|
| 1,074,809 | 10/1913 | Newton | 102—98 |
| 1,611,353 | 12/1926 | Lepinte | 60—35.6 |
| 2,744,043 | 5/1956 | Ramberg | 60—35.6 |
| 2,816,418 | 12/1957 | Loedding | 60—35.6 |
| 2,995,011 | 8/1961 | Kimmel | 60—35.6 |
| 3,017,746 | 1/1962 | Kiphart | 60—35.6 |
| 3,032,970 | 5/1962 | Fox | 60—35.6 |
| 3,054,353 | 9/1962 | Rumpp et al. | 86—1 |
| 3,088,273 | 5/1963 | Adelman et al. | 60—35.6 |
| 3,092,961 | 6/1963 | Dobell | 60—35.6 |

FOREIGN PATENTS 1,112,030  11/1955  France.

MARK NEWMAN, *Primary Examiner.*

SAMUEL LEVINE, *Examiner.*